United States Patent
Chandross et al.

[11] Patent Number: 5,849,173
[45] Date of Patent: Dec. 15, 1998

[54] ELECTROLYTIC-ETCHING METHOD OF RESHAPING AN ELECTRODE FOR FIBER SPLICING

[75] Inventors: Edwin A. Chandross; Sandra G. Kosinski, both of Murray Hill, N.J.

[73] Assignee: Lucent Technologies Inc., Murray Hill, N.J.

[21] Appl. No.: 772,292

[22] Filed: Dec. 23, 1996

[51] Int. Cl.[6] ........................................ C25F 3/08

[52] U.S. Cl. ........................................... 205/664; 205/674

[58] Field of Search ...................................... 205/664, 674

[56] References Cited

U.S. PATENT DOCUMENTS

| | | | |
|---|---|---|---|
| 4,375,396 | 3/1983 | Beggs et al. | 205/664 X |
| 5,035,780 | 7/1991 | Suzuki et al. | 205/664 X |
| 5,178,742 | 1/1993 | Lemke et al. | 205/664 |
| 5,286,355 | 2/1994 | Fainchtein et al. | 205/664 X |
| 5,630,932 | 5/1997 | Lindsay et al. | 205/664 X |

OTHER PUBLICATIONS

Research Paper entitled "Plasma Welding of Optical Fibers" by Dan Tillbert: Alfén Laboratory, Royal University of Technology: Ericsson Business Networks AB: pp. 7–68, no date available.

*Primary Examiner*—Donald R. Valentine

[57] ABSTRACT

A method to improve the robustness of an elongated electrode used in an arc fusion apparatus for splicing optical fibers by reshaping the tip of the elongated electrode by electrolytic etching. The method involves reshaping the substantially sharp tip of the elongated electrode by immersing it as the anode in an electrolyte solution, the electrolyte solution is one capable of dissolving an oxidation product of the elongated electrode. Then a second electrode is provided at a predetermined distance from the elongated electrode in the electrolyte solution. Afterward, an electrical current is passed, or caused to flow, between the elongated electrode and the second electrode for a predetermined period of time through the electrolyte solution to reshape the substantially sharp tip of said elongated electrode into a predetermined profile having a substantially round tip.

26 Claims, 1 Drawing Sheet

ELECTROLYTIC-ETCHING METHOD OF RESHAPING AN ELECTRODE FOR FIBER SPLICING

BACKGROUND

The present invention is directed, in general, to an electrolytic etching method for optimizing the conformation by reshaping the sharp tip of an electrode used in arc fusion for splicing optical fibers.

Conventional copper cables are rapidly becoming obsolete for earth-bound communication and information transmission. The copper cables are being replaced by optical cables which contain a large number of optical fibers each of which has a high capacity and reliability for the transmission of digital signal on an optical, in contrast to an electrical, path.

With the advance of new technology, new problems also begin to surface.

Splicing an electrical cable has not caused any significant problems. In an electrical cable, the cable ends can be joined together easily and the electrical signal passes through without any significant problems.

Splicing an optical fiber, however, is not an easy task. Information is transmitted through optical fiber by optical digital transmission. Each optical fiber is essentially a thin glass or silica fiber, having a diameter of about 125 $\mu$m, with an even thinner core of approximately 3–10 $\mu$m, in which the information is transmitted in the form of coded pulses. The portion other than the core is generally referred to as cladding. The purpose of the core is to conduct light, and it is usually doped with germanium in order to make its refractive index 0.01 to 0.02 higher than the n =1.46 of the cladding. The fiber is protected by a primary shield of acrylate and commonly a secondary shield that usually consists of a related plastic material. More recently, it is common to have four-twelve ply cables, or ribbons, consisting of four-twelve fibers with primary shielding arranged in the same plane and roughly one fiber diameter apart from one another. Thus, in principle, an optical fiber is a long flexible silica fiber through which laser light can be conducted. The problem is: that method can be used to join or splice glass fibers quickly and effectively, to result in high strength joints having low optical loss.

Essentially, two main methods are used to join optical fibers. One is mechanical joining, where the fiber ends are placed into connectors which are then mechanically joined together. The other main method is the permanent joining of the fiber ends by melt fusion. Currently, the most common method of melting fiber ends involves a small electrical discharge using two point shaped electrodes between which the fiber ends are inserted. The process actually includes four steps: (1) Stripping and removing the primary and secondary protective cover from the fiber; (2) cleaving; (3) fusion welding; and (4) splice protection. Special equipment is available for removing the primary and the secondary shield in the process of stripping. Two stripped fiber ends that are to be joined must have cut ends that are as flat, and as close relative to the fiber axis to 90 degrees, as possible. Again, special equipment is available for this cleaving process. The actual joining operation of fiber ends consists of a series of steps, such as coating removal, alignment of the fibers, and welding and splice analysis. The joining is usually accomplished by placing the fiber ends that have been "prepared" in an electrical discharge. The fiber is placed in a single small, precision-ground groove, known as the v-groove. The v-groove is placed in a movable device that can be positioned by a high precision stepping motor. In this way, the cleaved fiber ends are placed end-to-end so that they meet at a point between the electrode. Next comes the splicing process, which consists of two steps: In a first optional step, the fiber ends are exposed to an arc with a short duration, usually lasting about 0.3 to 0.5 seconds, and at a low current, about 10 mA, to remove any impurities on the fiber ends. Then follows the actual splicing process. This in turn consists of one—three steps, which are determined by the current in the discharge and by its duration. In the case of the Ericsson FS0900 fusion splicer, the first of the three steps consists of a shorter pulse, normally lasting approximately 0.3 to 0.5 seconds at a relatively low current of approximately 10 to 11 mA to preheat the fiber. The second step is the actual splicing which takes about 2–3 seconds for a single fiber and about 6–8 seconds for a ribbon. Depending on the type of fiber used, the current can be adjusted, most commonly in the region of 15 mA. The third step involves several seconds at a low current, on the order of 10 to 12 mA, to minimize mechanical stresses.

Among other components, a splicing machine has a discharge generator, generally referred to as a "high voltage component." This "high voltage component" consists primarily of two point shaped electrodes and an electronic circuit which includes a transformer to supply alternating current with specific characteristics to the electrodes.

A gas, such as air, is neutral having essentially no charged particles. The gas is therefore generally not conductive in electrical terms. Under the influence of a sufficiently strong electrical field, however, gas atoms and molecules can become ionized, yielding an ionized gas, consisting of ions, electrons and neutral particles. Hence, the gas becomes electrically conductive. The process that occurs is known as breakdown. Thus, a breakdown provokes a current in the gas, and is referred to as a discharge, generally known as an electrical discharge or gas discharge. The discharges can be self-sustaining or non-self-sustaining. Self-sustaining discharges are related to the splicing applications. Gas discharges can be divided into several main groups, two of which are glow discharge and arc discharge.

A glow discharge becomes an arc discharge when the current becomes sufficiently great. This can occur without an increase in current if the cathode becomes sufficiently hot. An arc discharge is characterized by a very low voltage drop.

The electrodes used for welding optical fibers are generally cylindrical and machined into a very sharp point at one end. They are usually made of sintered tungsten containing a small amount of thorium. The point cone angle of the electrode is approximately 28 degrees. The electrodes are usually mounted in a plastic electrode housing. Two "v-grooves," which consist of triangular grooves that are used to retain fibers during splicing, are mounted several mm to the sides of the electrode axis.

After a number of repeated uses in welding or splices, an electrode deteriorates. In some cases, material from poorly cleaned fibers may coat the electrode and thus increase the voltage needed to strike an arc. The increase in voltage can be caused by contamination by dust and other substances in the air, silica from the fiber, or material that is eroded from the electrode surfaces during the glow process. Thus, voltage drop in an electrode can vary over time.

An electrode gets dirty easily. After several welding operations, an electrode must be cleaned. However, this presents a serious problem because, too often, the sharp tip of the electrode is deformed, bent, or even broken during cleaning. The sharp tip of the electrode is also often deformed, bent, or even broken, during regular handling.

In an attempt to improve the stability and functionality of the electrode, a "burn in" process has been developed. Here the pair of electrodes with fiber are deliberately arced in the gap to deposit a thin layer of silica and to slightly "round up" the tips. The "burn in" process has been tried with or without silica. So far, however, there has been no easy way to manufacture an electrode with a well defined "rounded" tip.

Accordingly, what is needed in the art is a method to manufacture a "robust" electrode that can withstand regular handling, repeated cleaning, and multiple uses without sacrificing its performance in fusing optical fibers.

SUMMARY OF THE INVENTION

To address the above-discussed deficiencies of the art, the present invention provides a method to improve the robustness of a standard, commercially available elongated electrode used in an arc fusion process for splicing optical fibers by first shaping the tip of the usual commercially available elongated electrode by electrolytic etching. The method involves reshaping the relatively sharp, thin tip of the elongated electrode into a predetermined profile with a relatively round tip. The reshaping is carried out by immersing this substantially sharp tip of the elongated electrode, which is to be the anode, in an electrolyte solution that is capable of dissolving oxidation products of the electrode material. A second electrode, which is to become the cathode, is provided at a predetermined distance from the elongated electrode in the electrolyte solution. Afterward, an electrical current is caused to flow between the elongated (anode) electrode and the second (cathode) electrode through the electrolyte solution for a predetermined period of time to etch away the sharp point and thus reshape the substantially sharp tip of said elongated electrode into a substantially round tip having a predetermined shape. The tip of the etched electrode has a local angle in a range of from about 50 degrees to about 60 degrees. The resultant reshaped elongated electrode possesses improved robustness in an arc fusion for splicing optical fibers.

Prior art would indicate that a sharper tip is advantageous for initiating an electric arc, however the arc may become unstable if the electrodes become dirty or age in a way which provides other low energy sites for arc initiation. At this time the arc begins to jump from side to side causing an undesirable instability which can lead to higher loss in the splices and poor loss estimation by the fusion splicer. With the etched tip electrodes the arc remains stable over a longer period of use. In addition the etched electrodes are resistant to bending and breaking during the cleaning process.

The apparatus for the electrolytic etching includes: (1) a cell for containing an electrolyte solution (2) the tip of the elongated electrode immersed in the electrolyte solution, (3) a second electrode separated a predetermined distance from the elongated electrode also immersed in the electrolyte solution and (4) a current-generating circuit, coupled to the elongated and second electrodes, for causing a predetermined quantity of an electrical current to flow between the elongated and second electrodes and through the electrolyte solution.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
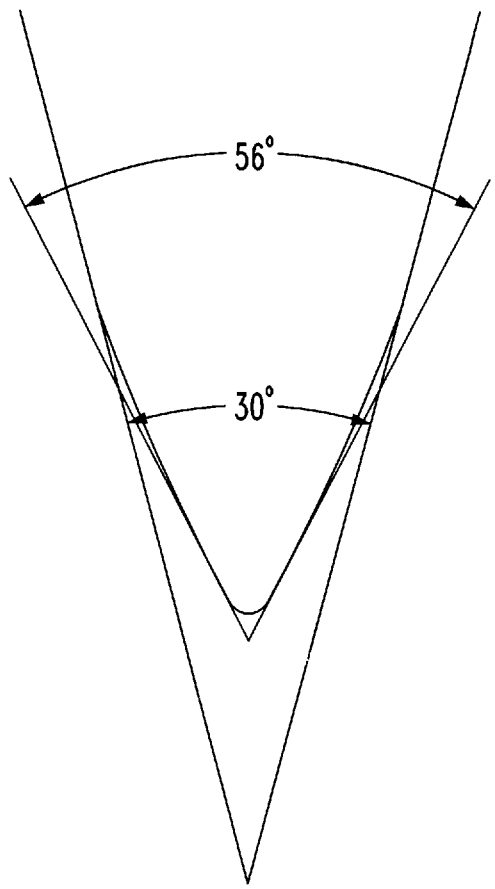
FIG. 1 illustrates the outline of the tip of an etched reshaped tungsten electrode before and after the reshaping process, the sharper tip is the one before being reshaped.

The present invention introduces a straightforward and reliable method for electrolytically reshaping the relatively sharp tip of an electrode useful in an arc fusion for splicing optical fibers. The method is performed in an electrolyte solution that can dissolve the oxidation products of the electrode to be reshaped. The etched and reshaped tip has a predetermined profile, is relatively round, and has improved stability and functionality for arc fusion. The tip of the electrode so etched and reshaped is more robust, in that it can withstand regular handling, repeated arcing and mechanical cleaning, and multiple uses without sacrificing its performance in welding optical fibers. The technique is particularly useful in conjunction with electrodes used for arc-fusion of optical fibers. In an embodiment to be illustrated and described, the electrolytic etching that takes place creates an electrode with a tip of reliable shape and relatively rounded end.

The elongated electrode can be made up of tungsten, or any hard, refractory corrosion resistant metal such as molybdenum. The preferred electrode is made up of tungsten. A small amount of thorium can be included in a sintered "tungsten" electrode. Tungsten can be electrochemically oxidized to form soluble tungstates in an alkaline medium.

The point angle of a commercially available tungsten electrode is between the range of 26 to 30 degrees. Normally, the point angle of a tungsten electrode is about 28 degrees.

The second electrode can be made up of silver or stainless steel. Preferably, the second electrode is composed substantially of stainless steel. However, the second electrode may be composed of a variety of other materials that are good conductors and are not attacked by aqueous alkaline solutions and still be within the broad scope of the present invention.

The second electrode, the cathode, can have a substantially planar surface placed substantially horizontally under the first electrode, the anode. When using a single substantially planar second electrode, several anodes can be shaped simultaneously.

The electrolyte solution for the present invention is a solution that will dissolve the oxidation products of the elongated electrode. In one embodiment of the present invention, the electrolyte solution is an alkaline solution. A preferred embodiment of the electrolyte solution comprises a hydroxide solution of Group 1A element of the periodic table. In a more preferred embodiment, the Group 1A hydroxide solution is an aqueous potassium hydroxide solution or an aqueous sodium hydroxide solution. Other alkali metal hydroxides can also be used. Other bases, such as tetramethylammonium hydroxide solution, can also be used.

The concentration of the electrolyte solution is not very critical. For example, the range of from about 0.1 to about 5M solution of an aqueous alkali hydroxide solution is sufficient. A concentration range of from about 1 to about 2M solution is, however, preferred.

The etching process is controlled by the current density, time and temperature. It is most preferred to operate at ambient temperature of from about 20° to about 25° C. The electrical parameters can be determined empirically.

In a preferred embodiment of the present invention, the current used to reshape the relatively substantially sharp tip of an elongated electrode is between 50 and 150 milliamperes.

In a preferred embodiment of the present invention, the current-generating circuit causes the predetermined quantity of electrical current to flow for between 1 and 10 minutes. In a more preferred embodiment, the predetermined quantity of electrical current flows for about 2 minutes. Empirically, this has been determined to be appropriate for forming a tip of predetermined profile in a tungsten electrode, the anode, using stainless steel as the second electrode, the cathode, in a 1N KOH aqueous solution as the electrolyte solution.

In a preferred embodiment of the present invention, the current-generating circuit causes the predetermined quantity of electrical current to flow at a potential of between 1 and 10 volts. In a more preferred embodiment, the predetermined quantity of electrical current flows at a potential of about 5 volts. Again, this has been determined empirically to be appropriate for forming a tip of predetermined profile in a tungsten electrode, the anode, using a stainless steel electrode as the second electrode, the cathode, in a 1N KOH aqueous solution as the electrolyte solution.

The etched and reshaped electrode has a local angle in a range of from about 50 to about 60 degrees. Most preferably, the local angle is about 56 degrees with a relatively rounded end or tip.

The electrode, particularly the tungsten electrode, having a reshaped tip by the electrolytic etching method, can be used for fiber splicing at various ambient temperatures and pressures in both humid and dry atmospheres. The voltage is controlled by a machine to a maximum of about 10 kV at the start of the discharge with the voltage drop during the arc being from about 500 to about 700 V for a set point of from about 10 to about 20 mA. The etched electrode is more robust than the standard commercial electrode and is clean and ready for use in fusing optical fibers. The reshaped electrode tip leads to substantially fewer failures in the fusion of optical fibers. The electrode tip so etched and reshaped lasted at least twice as long in factory use.

The improvements in robustness and longevity of an electrode that has been etched and reshaped were tested and measured under standard factory conditions of approximately 45% relative humidity, and about 24° C., using a range of arc currents from abut 15 to abut 16.5 mA with corresponding voltage as controlled by the Ericsson FSU905 fusion splicer.

The modes of failure for standard electrodes available commercially include bent, broken or dirty tips. The only mode of failure for the etched and reshaped electrode is contamination, a problem that can readily be solved by proper cleaning. Further, the etched and reshaped electrode can withstand rough handling and repeated cleaning much better than a standard electrode available commercially.

The following Example illustrates the preferred embodiment to illustrate the invention. However, it is to be understood that the invention is not intended to be limited to the specific embodiments.

EXAMPLE

Figure 2:
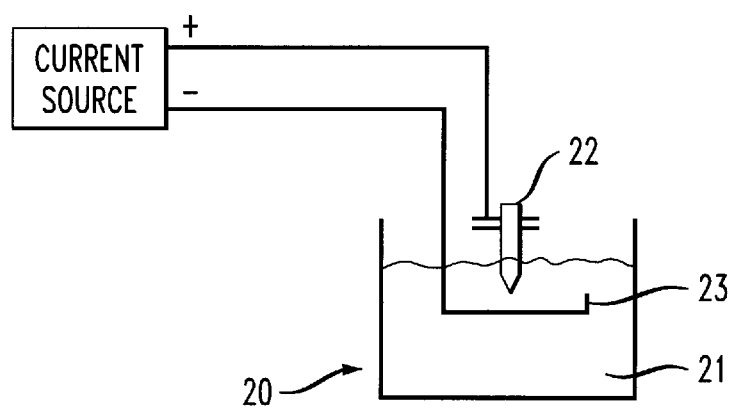
FIG. 2 illustrates the apparatus used for reshaping.

In a cell (20) containing 1M KOH aqueous electrolyte solution (21) was placed a relatively pure tungsten electrode as the anode (22). It is commercially available from Ericsson, and possesses a very sharp tip. At a predetermined distance away from the tungsten electrode was placed a stainless steel electrode, the cathode (23), in the form of a horizontal plate extending under but away from the tip of the tungsten electrode (FIG. 2). A direct current on the order of about 100 mA at 5 V was passed between the electrodes for approximately 2 minutes at ambient temperature and pressure. The relatively pure tungsten electrode obtained after the electrolytic etching process had a local angle at the tip of approximately 56 degrees with a relatively round end.

The foregoing has outlined, rather broadly, preferred and alternative features of the present invention so that those skilled in the art may better understand the detailed description of the invention that follows. Additional features of the invention will be described hereinafter that form the subject of the claims of the invention. Those skilled in the art will appreciate that they can readily use the disclosed conception and specific embodiment as a basis for designing or modifying other structures for carrying out the same purposes of the present invention. Those skilled in the art will also realize that such equivalent constructions do not depart from the spirit and scope of the invention in its broadest form.

What is claimed is:

1. A method for reshaping a substantially sharp tip of an elongated tungsten electrode to improve robustness of said elongated electrode in an arc fusion for splicing optical fibers, said method comprising the steps of:

immersing said substantially sharp tip of said elongated tungsten electrode in an electrolyte solution, said electrolyte solution being capable of dissolving an oxidation product of said elongated electrode;

providing a stainless steel electrode at a distance from said elongated tungsten electrode in said electrolyte solution;

causing an electrical current to flow between said elongated tungsten electrode as the anode and said stainless steel electrode as the cathode for a period of time through said electrolyte solution to reshape said substantially sharp tip of said elongated tungsten electrode into a profile having a substantially round tip, creating a reshaped elongated tungsten electrode possessing improved robustness in said arc fusion for splicing said optical fibers.

2. The method of claim 1, wherein said electrolyte solution comprises alkaline aqueous solution.

3. The method of claim 2, wherein said alkaline aqueous solution comprises a solution of Group 1A hydroxide.

4. The method of claim 2, wherein said alkaline aqueous solution comprises a potassium hydroxide solution.

5. The method of claim 4, wherein said potassium hydroxide solution has a concentration in a range of from about 0.1M to about 5M.

6. The method of claim 1, wherein said electrical current is a direct current in the range of from about 1 milliampere to about 150 milliamperes.

7. The method of claim 1, wherein said period of time is in the range of from about 1 minute to about 10 minutes.

8. The method of claim 1, wherein said electric current flows at a potential in the range of from about 1 volt to about 10 volts.

9. The method of claim 1, wherein said reshaped elongated tungsten electrode has a local angle in a range of from about 50 degrees to about 60 degrees.

10. The method of claim 1, wherein said reshaped elongated tungsten electrode has a focal angle of about 56 degrees.

11. The method of claim 1, wherein said stainless steel electrode has a substantially planar surface and is situated under said first electrode in a substantially horizontal configuration.

12. The method of claim 11, further comprising a plurality of elongated anodes each having a substantially sharp tip.

13. A method for reshaping a substantially sharp tip of an elongated tungsten electrode to improve robustness of said elongated electrode in an arc fusion for splicing optical fibers, said method comprising the steps of:

immersing said substantially sharp tip of said elongated tungsten electrode in an alkaline solution, said alkaline solution being capable of dissolving an oxidation product of said elongated electrode;

providing a stainless steel electrode at a distance from said elongated tungsten electrode in said alkaline solution;

causing an electrical current to flow between said elongated tungsten electrode as the anode and said stainless steel electrode as the cathode for a period of time through said alkaline solution to reshape said substantially sharp tip of said elongated tungsten electrode into a profile having a substantially round tip, creating a reshaped elongated tungsten electrode possessing improved robustness in said arc fusion for splicing said optical fibers.

14. The method of claim 13, wherein said alkaline solution comprises a solution of Group 1A hydroxide.

15. The method of claim 13, wherein said alkaline solution comprises a potassium hydroxide solution.

16. The method of claim 15, wherein said potassium hydroxide solution has a concentration in a range of from about 0.1M to about 5M.

17. The method of claim 13, wherein said electrical current is a direct current in the range of from about 1 milliampere to about 150 milliamperes.

18. The method of claim 13, wherein said period of time is in the range of from about 1 minute to about 10 minutes.

19. The method of claim 13, wherein said electric current flows at a potential in the range of from about 1 volt to about 10 volts.

20. The method of claim 13, wherein said reshaped elongated tungsten electrode has a local angle in a range of from about 50 degrees to about 60 degrees.

21. The method of claim 13, wherein said reshaped elongated tungsten electrode has a focal angle of about 56 degrees.

22. The method of claim 13, wherein said stainless steel electrode has a substantially planar surface and is situated under said first electrode in a substantially horizontal configuration.

23. The method of claim 22, further comprising a plurality of elongated anodes each having a substantially sharp tip.

24. The method of claim 22, further comprising a plurality of elongated anodes each having a substantially sharp tip.

25. The method of claim 13, wherein said stainless steel electrode has a substantially planar surface and is situated under said first electrode in a substantially horizontal configuration.

26. A method for reshaping a substantially sharp tip of an elongated tungsten electrode to improve robustness of said elongated electrode in an arc fusion for splicing optical fibers, said method comprising the steps of:

immersing said substantially sharp tip of said elongated tungsten electrode in an aqueous potassium hydroxide solution;

providing a stainless steel electrode at a distance from said elongated tungsten electrode in said aqueous potassium hydroxide solution;

causing a direct electrical current in a range of from about 1 milliampere to about 150 milliamperes at a voltage range of from about 1 volt to about 10 volts to flow between said elongated tungsten electrode as the anode and said stainless steel electrode as the cathode for a period in the range of from about 1 minute to about 10 minutes through said alkaline solution to reshape said substantially sharp tip of said elongated tungsten electrode into a profile having a substantially round tip having a local angle in a range of from about 50 degrees to about 60 degrees, creating a reshaped elongated tungsten electrode possessing improved robustness in said arc fusion for splicing said optical fibers.

* * * * *